Patented Sept. 12, 1939

2,172,540

UNITED STATES PATENT OFFICE 2,172,540

CONVERSION OF ALCOHOLS TO AROMATIC HYDROCARBONS

Vasili Komarewsky, Chicago, Ill., assignor to Universal Oil Products Company, Chicago, Ill., a corporation of Delaware No Drawing. Application April 23, 1938,
Serial No. 203,819

10 Claims. (Cl. 260—668)

This invention relates particularly to the conversion of alcohols containing six or more carbon atoms in straight chain arrangement into aromatic hydrocarbons. It is specially concerned with the use of types of catalysts which are particularly effective in promoting this type of conversion reaction.

In one specific embodiment the present invention comprises a process for the simultaneous dehydration and dehydrogenation of primary alcohols which consists in passing their vapors over alumina-chromia catalysts to produce material yields of aromatic hydrocarbons having the same number of carbon atoms as were present in the alcohol.

In a further specific embodiment the invention may employ secondary or other isomeric fatty alcohols which have at least six carbon atoms in straight chain arrangement as long as the hydroxyl group is attached to one of the straight chain carbon atoms. In this case the aromatic hydrocarbons produced will be of the alkyl substituted variety.

One of the features of the present process resides in employment of mixed catalysts which have a concurrent dehydrating and dehydrogenating action. It is obvious that in the formation of benzene from normal hexyl alcohol the first step must involve the removal of the hydroxyl group along with one hydrogen from the aliphatic chain to form water. The next step involves the further loss of hydrogen followed by ring closure. The type of reaction characteristic of the process is shown in the equation given below:

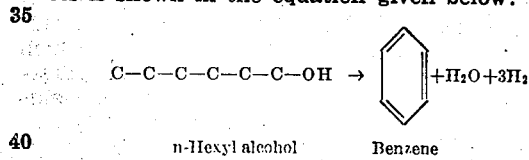

n-Hexyl alcohol    Benzene

Under properly controlled conditions, reactions of the preceding character predominate when the present type of catalyst is used although there will be some side-reactions accompanying the main reaction as is characteristic of all organic reactions. The range of temperature most applicable to formation of aromatics from alcohols is from 300–500° C. and there is no independent effect of pressure so that operations are preferably conducted under ordinary atmospheric conditions. The feature of the present invention is the employment of mixed catalysts which have a component active in dehydrating alcohols and one active in further dehydrogenating the residues thus produced. It is recognized that alumina has been used in the dehydration of alcohols to produce olefins and that chromia (chromium sesquioxide) has been used in the dehydrogenation of hydrocarbons but it is considered novel in the present instance to employ these catalysts jointly to effect the two types of reactions concurrently. As alternatives to the chromium sesquioxide, corresponding lower oxides of molybdenum, vanadium, and tungsten may be employed although obviously not with exactly equivalent results.

The alumina employed in the catalyst composites is preferably of the so-called activated variety which is producible by carefully calcining the more highly hydrated oxides of alumina such as, for example, the precipitates obtained by adding ammonia to solutions of aluminum salts and the hydrated minerals bauxite and gibbsite, having the formulas $Al_2O_3.2H_2O$ and $Al_2O_3.3H_2O$ respectively. The mineral diaspore, $Al_2O_3.H_2O$ and the mineral corundum, which in its various forms corresponds to the anhydrous oxide, do not give forms of alumina which are sufficiently active to be used as ingredients of the catalyst composites preferably employed for the present type of reactions. In calcining a hydrated aluminum oxide to produce forms of activated alumina, the use of temperatures within the range of 600–750° C. is preferable, which does not correspond to complete dehydration of the hydrated oxide, experiments having indicated that some of the activity in respect to dehydrogenating reactions is lost if the calcining is continued under temperatures which completely dehydrate the material.

The preferred compounds for compositing with alumina to add a dehydrogenating effect to the dehydrating effect thereof are the lower oxides of the elements of the left-hand column of the 6th group of the periodic table comprising chromium, molybdenum, and tungsten, although alternatively it has been found that the lower oxides of vanadium also have a sufficient dehydrogenating effect to be utilizable. The composite preferably contains about 70% of activated alumina and 30% of the oxides of the dehydrogenating catalysts. In the case of chromium composite materials may be made by adding sized particles of activated alumina to solutions of chromic acid or chromic nitrate and heating moderately to assist adsorption of the dissolved compounds, or a limited amount of the solution may be added to the alumina granules and the total material heated, dried, and calcined to remove excess water and, in the case of the nitrate, the acid radical. After this calcining there may be some combination of the alumina with chromium trioxide to form aluminum chromates and the next step in the process of catalyst preparation consists in subjecting the mixture of alumina and chromic anhydride to treatment with hydrogen to reduce the oxide and the chromate and leave a residue of chromium sesquioxide on the alumina. The temperature of reduction may be selected at some point above 250° C. to insure substantially complete conversion to the lower oxide.

When catalysts comprising alumina and molybdenum sesquioxide are to be used, solutions of soluble molybdenum compounds such as molybdenum pentachloride in hydrochloric acid solution, molybdic oxide dissolved in aqueous ammonia or nitric acid, and ammonium molybdate are employed, the last being generally preferable since the ammonia is readily driven off in the calcining step. The step of reduction was carried out in the same way as in the case of alumina using somewhat higher temperatures since molybdenum trioxide only undergoes initial reduction at 300° C. to form the brown dioxide and the reduction of this material does not take place at a rapid rate until approximately 500° C. is reached.

In the case of tungsten, solutions of ammonium tungstate may be conveniently used as sources of tungstic acids which correspond to various degrees of hydration of the trioxide. Alternatively the tungstic acids may be precipitated on alumina particles in solutions in water by the use of ammonium or alkali metal hydroxides or carbonates as precipitants, the hydroxide being ignited later to form mixtures of the trioxide and dioxide which are reducible at temperatures of the order of 300° C. to form the desired sesquioxide.

The addition of vanadium oxides to alumina may be most conveniently made by employing solutions of ammonium or the alkali metal vanadates. Vanadium pentoxide which is the primary compound formed is reducible by hydrogen at red heat to ulimately form the black sesquioxide.

The following example is introduced to indicate the type of results to be expected when employing the present type of composite catalysts in forming aromatics from aliphatic alcohols although the scope of the invention is obviously broader than the example introduced.

Normal heptyl alcohol was vaporized and superheated to a temperature of 500° C. at atmospheric pressure and was then passed continuously over a catalyst composite comprising 70% of alumina and 30% of chromium sesquioxide. In a single pass from 116 parts by weight of the alcohol, 69 parts by weight of hydrocarbon liquid was obtained which contained in turn 35 parts by weight of toluene. Ultimate recycling of the unconverted alcohol raised the yield of toluene to 60%.

I claim as my invention:

1. A process for producing aromatic hydrocarbons from aliphatic alcohols containing 6 or more carbon atoms in straight chain arrangement which comprises passing the vapors of said alcohols at a dehydrating and dehydrogenating temperature over composite catalysts comprising activated alumina supporting minor proportions of lower oxides of elements selected from the group consisting of chromium, molybdenum, vanadium and tungsten.

2. A process for producing aromatic hydrocarbons from aliphatic alcohols containing 6 or more carbon atoms in straight chain arrangement which comprises passing the vapors of said alcohols at temperatures within the approximate range of 300–500° C. over composite catalysts comprising activated alumina supporting minor proportions of lower oxides of elements selected from the group consisting of chromium, molybdenum, vanadium and tungsten.

3. A process for producing aromatic hydrocarbons from aliphatic alcohols containing 6 or more carbon atoms in straight chain arrangement which comprises passing the vapors of said alcohols at temperatures within the approximate range of 300–500° C. under substantially atmospheric pressure over composite catalysts comprising activated alumina supporting minor proportions of lower oxides of elements selected from the group consisting of chromium, molybdenum, vanadium and tungsten.

4. A process for producing aromatic hydrocarbons from aliphatic alcohols containing 6 or more carbon atoms in straight chain arrangement which comprises passing the vapors of said alcohols at temperatures within the approximate range of 300–500° C. under substantially atmospheric pressure over composite catalysts comprising activated alumina supporting minor proportions of lower oxides of chromium.

5. A process for producing aromatic hydrocarbons from aliphatic alcohols containing 6 or more carbon atoms in straight chain arrangement which comprises passing the vapors of said alcohols at temperatures within the approximate range of 300–500° C. under substantially atmospheric pressure over composite catalysts comprising activated alumina supporting minor proportions of lower oxides of molybdenum.

6. A process for producing aromatic hydrocarbons from aliphatic alcohols containing 6 or more carbon atoms in straight chain arrangement which comprises passing the vapors of said alcohols at temperatures within the approximate range of 300–500° C. under substantially atmospheric pressure over composite catalysts comprising activated alumina supporting minor proportions of lower oxides of tungsten.

7. A process for producing aromatic hydrocarbons from aliphatic alcohols of at least six carbon atoms in straight chain arrangement, which comprises contacting the alcohol at a dehydrating and dehydrogenating temperature with a mixture of a dehydrating catalyst and a dehydrogenating catalyst.

8. A process for producing aromatic hydrocarbons from aliphatic alcohols of at least six carbon atoms in straight chain arrangement, which comprises contacting the alcohol at a dehydrating and dehydrogenating temperature with alumina suporting a dehydrogenating catalyst.

9. A process for producing aromatic hydrocarbons from aliphatic alcohols of at least six carbon atoms in straight chain arrangement, which comprises contacting the alcohol at a temperature within the approximate range of 300–500° C. with a mixture of a dehydrating catalyst and a dehydrogenating catalyst.

10. A process for producing aromatic hydrocarbons from aliphatic alcohols of at least six carbon atoms in straight chain arrangement, which comprises contacting the alcohol at a temperature within the approximate range of 300–500° C. with alumina supporting a dehydrogenating catalyst.

VASILI KOMAREWSKY.